United States Patent
Green et al.

(10) Patent No.: US 8,895,096 B2
(45) Date of Patent: Nov. 25, 2014

(54) CONTINUOUS OVEN WITH A CASCADING CONVEYOR

(75) Inventors: Ramonica Green, Fort Worth, TX (US); Ponnattu Kurian Joseph, Irving, TX (US)

(73) Assignee: Frito-Lay North America, Inc., Plano, TX (US)

( * ) Notice: Subject to any disclaimer, the term of this patent is extended or adjusted under 35 U.S.C. 154(b) by 176 days.

(21) Appl. No.: 13/166,676

(22) Filed: Jun. 22, 2011

(65) Prior Publication Data

US 2012/0328752 A1   Dec. 27, 2012

(51) Int. Cl.
*A21B 1/42* (2006.01)
*A21D 8/06* (2006.01)

(52) U.S. Cl.
USPC ........... 426/523; 99/443 R; 99/443 C; 99/477

(58) Field of Classification Search
CPC ........ Y10S 426/808; A21B 1/02; A21B 1/42; A21B 1/245; A21B 2/00; A21D 13/0074; A21D 17/00; A21D 17/06; A47J 36/20; A47J 36/22
USPC ....... 426/523; 99/330, 355, 443 C; 126/19 R; 198/801; 219/288, 411, 700
See application file for complete search history.

(56) References Cited

U.S. PATENT DOCUMENTS

| | | |
|---|---|---|
| 3,807,293 A | 4/1974 | Kramer |
| 3,978,748 A | 9/1976 | Leslie |
| 4,007,652 A | 2/1977 | Shinomiya |
| 4,048,885 A | 9/1977 | Miyakita |
| 4,246,838 A | 1/1981 | Pulver |
| 4,266,112 A | 5/1981 | Niedermeyer |
| 4,479,776 A * | 10/1984 | Smith ........................... 432/144 |
| 4,552,594 A | 11/1985 | Van Voskuilen |
| 4,735,566 A | 4/1988 | Squicciarini |
| 4,790,224 A | 12/1988 | Krutilla |
| 4,875,254 A | 10/1989 | Rudy |
| 4,889,043 A | 12/1989 | Mani |
| 4,931,140 A | 6/1990 | Peltola |
| 5,083,487 A | 1/1992 | Croteau |
| RE33,904 E | 4/1992 | Rudy |
| 5,200,222 A | 4/1993 | Schwab |
| 5,234,172 A | 8/1993 | Chupka |

(Continued)

FOREIGN PATENT DOCUMENTS

GB          1471016         4/1977
WO    WO 2009049081 A1 *   4/2009   ............... A21B 1/00

OTHER PUBLICATIONS

International Search Report and Written Opinion mailed on Apr. 8, 2013 for PCT Application No. PCT/US2013/023621 (8 pages).

(Continued)

*Primary Examiner* — Steven Leff
(74) *Attorney, Agent, or Firm* — Colin P. Cahoon; James H. Ortega; Carstens & Cahoon, LLP (57) ABSTRACT

A continuous oven comprising cascading conveyors. In one embodiment the oven comprises an oven floor, a ceiling, a left panel, and a right panel. The oven floor and ceiling are attached by the left and right sides defining an oven cavity. Located inside the oven cavity is at least one cascading conveyor. Also within the oven cavity is a partition which separates the oven into an upstream end and a downstream end.

30 Claims, 3 Drawing Sheets

(56) References Cited

U.S. PATENT DOCUMENTS

| | | | |
|---|---|---|---|
| 5,253,569 A | 10/1993 | McFarlane | |
| 5,304,055 A | 4/1994 | Van Lengerich et al. | |
| 5,317,794 A | 6/1994 | Lerner | |
| 5,365,816 A | 11/1994 | Rudy | |
| 5,410,951 A * | 5/1995 | Ledet et al. | 99/443 C |
| 5,473,967 A | 12/1995 | Frey | |
| 5,605,492 A | 2/1997 | Klingel | |
| 5,666,876 A * | 9/1997 | Vos | 99/443 C |
| 5,816,138 A | 10/1998 | Benson | |
| 5,826,496 A | 10/1998 | Jara | |
| 5,934,178 A | 8/1999 | Caridis | |
| 5,945,022 A | 8/1999 | Volpe | |
| 6,063,413 A | 5/2000 | Houraney | |
| 6,217,670 B1 | 4/2001 | Kacines | |
| 6,242,033 B1 | 6/2001 | Sander | |
| 6,291,002 B1 | 9/2001 | Goglanian | |
| 6,572,911 B1 | 6/2003 | Corcoran | |
| 6,746,701 B2 | 6/2004 | Kashou | |
| 7,000,513 B2 | 2/2006 | Zelinski | |
| 7,285,759 B2 | 10/2007 | Knost | |
| 7,432,483 B2 | 10/2008 | Wilson | |
| 2002/0066345 A1 | 6/2002 | Shepherd | |
| 2002/0139789 A1* | 10/2002 | Kuenen | 219/388 |
| 2002/0166457 A1* | 11/2002 | Conohan et al. | 99/386 |
| 2003/0091698 A1 | 5/2003 | Marsland | |
| 2004/0000543 A1 | 1/2004 | Dudek | |
| 2005/0229919 A1* | 10/2005 | Sands et al. | 126/41 C |
| 2006/0049285 A1 | 3/2006 | Sakai | |
| 2007/0207240 A1 | 9/2007 | Hansen et al. | |
| 2008/0053796 A1 | 3/2008 | DePaso | |
| 2010/0040736 A1 | 2/2010 | Van Haesendonck | |
| 2010/0215826 A1 | 8/2010 | Campbell | |
| 2011/0084056 A1 | 4/2011 | Kuenen | |
| 2011/0256277 A1 | 10/2011 | Bows et al. | |
| 2012/0196015 A1 | 8/2012 | Fuentes et al. | |

OTHER PUBLICATIONS

International Search Report and Written Opinion mailed Jan. 17, 2014, from PCT/US2013/053285 (11 pages).

* cited by examiner

CONTINUOUS OVEN WITH A CASCADING CONVEYOR

BACKGROUND OF THE INVENTION

1. Technical Field

The present invention relates to a convection oven.

2. Description of Related Art

Figure 1:
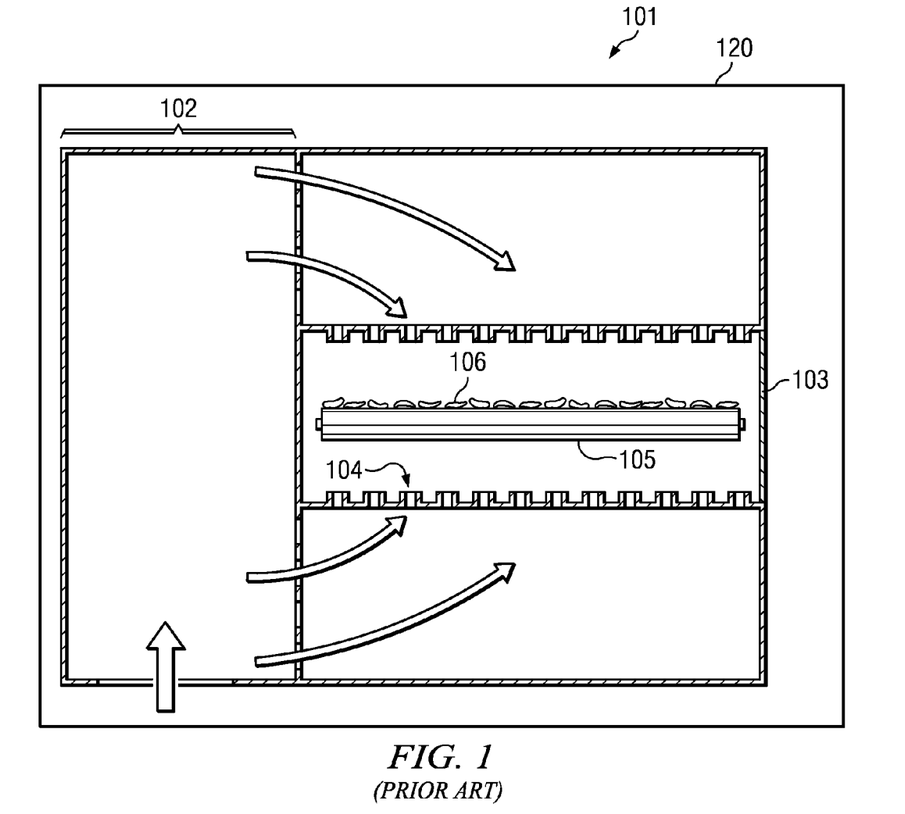
FIG. 1 illustrates a rear review of a prior art convection oven.

Convection ovens are used in the art to heat or dehydrate products. FIG. 1 illustrates a rear end review of a prior art convection oven 101. The oven 101 has a conveyor 105 upon which product 106 rests. The width of the conveyor 105 is illustrated. The conveyor 105 travels in the direction perpendicular to the width. The oven has a plenum 102 through which heated air is supplied to the oven. The plenum 102 directs air above and below the conveyor. Air is introduced to the product 106 through nozzles 104.

As those skilled in the art will appreciate, the conveyor 105 and the nozzles 104 need to be frequently inspected, cleaned, and repaired. Currently, this is accomplished by removing access panel 103. Access is not provided through the plenum 102 as this would require completely disassembling many parts of the oven 101. Consequently, access is limited to the access panel 103 which can only be reached after removing the oven shell 120. As can be seen, accessing nozzles 104 as well as the conveyor 105 located on the left of FIG. 1 is very difficult, particularly for wide and long industrial sized ovens. Thus, it is desirable to provide an oven with increased accessibility for cleaning and repairs while maintaining operating conditions in the oven.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Several embodiments of Applicants' invention will now be described with reference to the drawings. Unless otherwise noted, like elements will be identified by identical numbers throughout all figures. The invention illustratively disclosed herein suitably may be practiced in the absence of any element which is not specifically disclosed herein.

Figure 2:
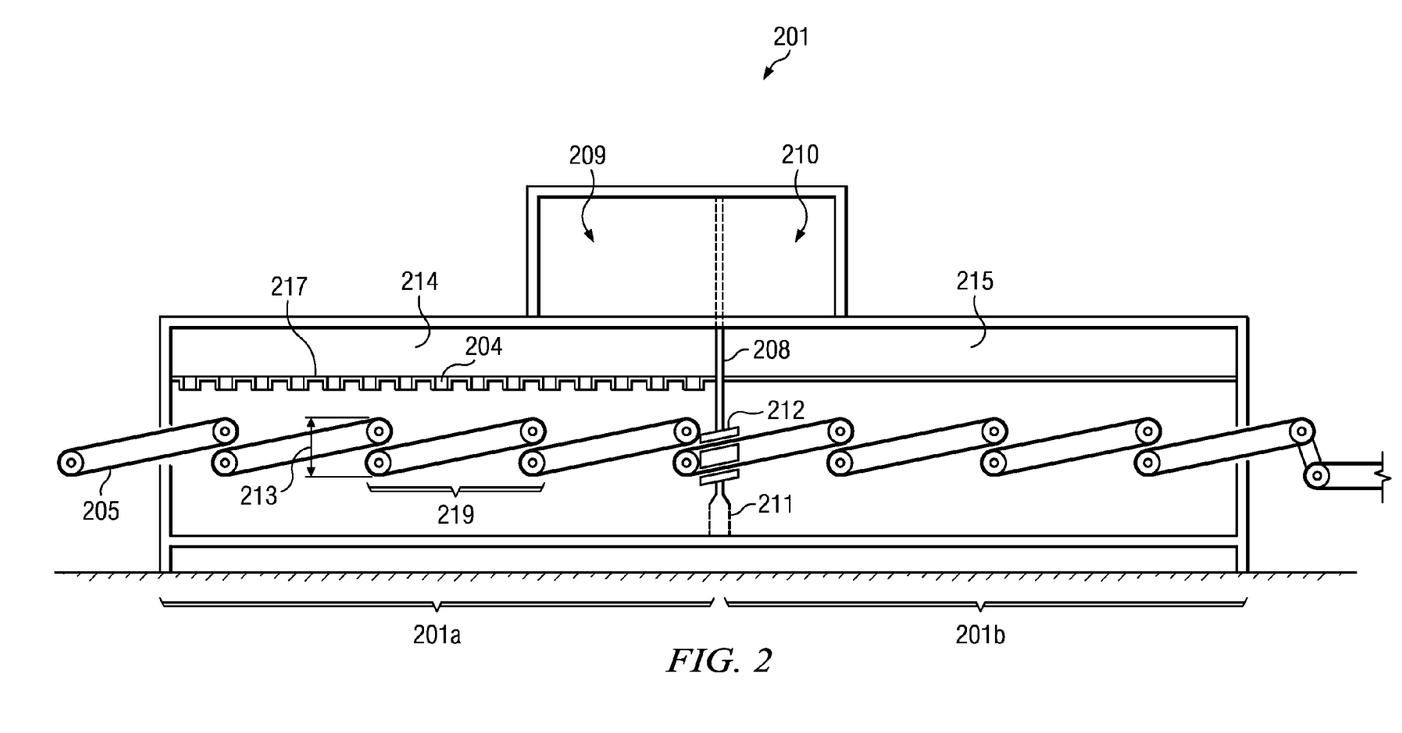
FIG. 2 is a side profile view of the oven in one embodiment.

FIG. 2 is a side profile view of the oven in one embodiment. The oven 201 can take many forms. In one embodiment the oven 201 is a thru-flow oven in which air is directed at the product. In one embodiment the oven 201 is a commercial sized oven. In one embodiment the oven 201 provides for easy cleaning while maintaining uniformity of oven conditions.

In one embodiment, the oven comprises at least one cascading conveyor 205. A cascading conveyor 205 is a conveyor which drops product to a lower elevation. In one embodiment the cascading conveyor 205 comprises a beginning end and a finish end, wherein the finish end has a higher elevation than the beginning end.

The cascading conveyors 205 operate to flip or turn the product. In one embodiment the cascading conveyors 205 turn the product with high frequency. Turning the product frequently allows for more uniform heating. Consequently, because the product is turned, a bed of product can be used as opposed to a monolayer of product. This is an advantage over the prior art which required a monolayer of product to ensure uniform heat application. Typically a bed of product does not heat uniformly. Instead, the top and the bottom of the bed heat much quicker than the middle of the bed. Using cascading conveyors 205 provides for the uniform heating of a monolayer but with the increased throughput of a bed. In one embodiment, operation of the multitude cascading conveyor 205 mimics the tumbling action found in conventional clothes dryers without damaging the product. As noted, such operation promotes uniform heating and dehydration.

As a bed of product can be utilized as opposed to a monolayer, more product can be placed on the conveyor 205 resulting in increased throughput. In one embodiment the bed of product ranges from about 0.5 to about 3 inches. In one embodiment the bed of product is limited by the distance allowed by the sealing device 212, discussed in detail below.

As depicted the cascading conveyors 205 are angled at angle $\alpha$. Those skilled in the art will understand that the length 219 of the conveyor and the angle of inclination $\alpha$ can be adjusted to control and modify the tumbling of the product. For example, increasing the angle of inclination $\alpha$ will increase the distance that the product must fall before it reaches the next downstream conveyor. This may be undesirable for brittle products which are subject to breakage. Therefore, for some products it may be desirable to have a decreased angle of inclination $\alpha$. In one embodiment the angle of inclination $\alpha$ ranges from about 5 to about 20, whereas in another embodiment the angle is about 11°.

Just as the length 219 and angle of inclination $\alpha$ can be adjusted, so too can the number of conveyors 205. For some products, the number of desired conveyors 205 will depend upon the bed depth. For example, a thicker bed depth may require more turns to properly agitate the bed and achieve uniform heating and/or dehydration. The product geometry, moisture content, type of oven, etc. will affect the number of desired turns. Virtually any number of turns can be utilized, for example, 2, 3, 4, 6, 8, 16, 17, etc.

In one embodiment, and as illustrated, a downstream conveyor 205 begins at substantially the same height as does the upstream conveyor 205. A conveyor begins at its most upstream location and ends at its most downstream location. Thus, in one embodiment at least two conveyors begin at the same height. Accordingly, in one embodiment at least two conveyors end at the same height. In one embodiment all cascading conveyors 205 begin at the same height, and in one embodiment all cascading conveyors 205 end at the same height. There is a surprising benefit for having all conveyors begin and end at the same height, and this is decreased oven height. If, for example, flat conveyors were utilized so that the downstream conveyor was located lower in height than the upstream conveyor so as to receive deposited product, the oven height would have to increase to account for the height differences of the upstream and downstream conveyors. This in turn would require a taller oven which results difficult access for cleaning and inspection. However, by maintaining a constant total conveyor height 213, a constant oven height can be achieved. Furthermore, the cavity space can be minimized resulting in decreased heating and energy costs.

As depicted the oven 201 has an upstream end 201a and a downstream end 201b. A partition 208 separates the upstream end 201a from the downstream end 201b. The partition is a physical boundary through which air has minimal passage. The partition 208 prevents air from passing from the upstream end 201 to the downstream end 201b except in specified pass-through 211 location whereby the air is allowed to pass from the upstream end 201a to the downstream end 201b. As depicted the pass-through 211 is located below the conveyor 205. In other embodiments, however, the pass-through 211 is located above the conveyor for process flexibility. The pass-through 211 can comprise any apparatus which conducts air from the upstream end 201a to the downstream end 201b. In one embodiment the pass-through 211 comprises a perforated wall. In another embodiment the pass-through 211 comprises a gap in the partition 208.

While in some embodiments the pass-through 211 comprises a conduit which transports air, in other embodiments the pass-through 211 further comprises an air treating device. In one embodiment the air treating device comprises a heater or cooler to alter the temperature of the conveyed air. The air treating device may also comprise a humidifier or the like to control the humidity of the air. In one embodiment the air treating device can comprise any device which treats air.

Figure 2A:
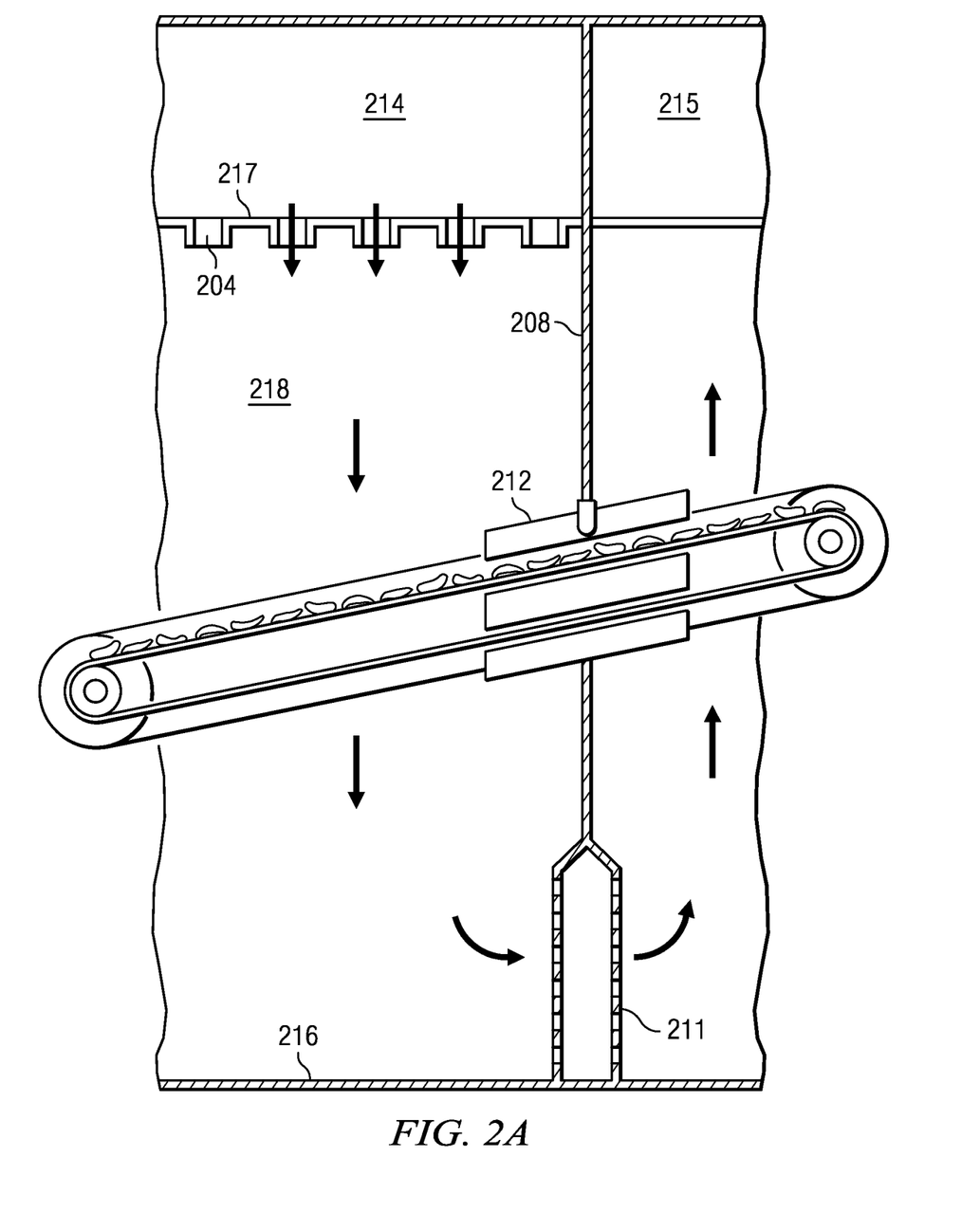
FIG. 2A is a magnified view of the sealing device from FIG. 2.

In one embodiment, as illustrated, the partition 208 further comprises a sealing device 212. FIG. 2A is a magnified view of the sealing device from FIG. 2. The sealing device 212 is located at the intersection of the conveyor 205 and the partition 208. The purpose of the sealing device 212 is to minimize or eliminate air flow through the sealing device 212 from the upstream end 201a to the downstream end 201b while simultaneously providing sufficient room through which the conveyor and product can pass. This forces the air to flow through the pass-through device 211. In one embodiment the sealing device 212 comprises brushes, flexible seals, and other devices which minimize air flow through a gap. In one embodiment the sealing device 212 is adjustable so as to allow objects of varying heights to pass.

As can be seen, the partition 208 separates the oven 201 into at least two zones: a zone for the upstream end 201a and a zone for the downstream end 201b. It should be noted that the at least two zones do not have to be of equal length. The purpose of having two zones is to be able to independently control and direct the air current within each zone. Each zone is in fluid communication with its own plenum. The upstream end 201a is in communication with an upstream plenum 209 through conduit 14 and the downstream end 201b is in communication with a downstream plenum 210 through conduit 15. In one embodiment the upstream plenum 209 and downstream plenum 210 are separated by the partition 208. In one embodiment re-heaters and/or circulating fans are placed within the plenums. In one embodiment a circulating fan is placed in plenum 209 making plenum 210 negative with respect to plenum 209. It should be noted that the partition 208 can be the same partition 208 located within the oven cavity. For example, as depicted the partition which separates the plenums 209, 210 is aligned with the below partition 208. In other embodiments the partition which separates the plenums 209, 210 is not aligned with the below partition 208. In some embodiments the partition which separates the plenums 209, 210 is a solid boundary whereas in other embodiments it has perforations.

In one embodiment the upstream plenum 209 is a supply plenum whereas the downstream plenum 210 is a return plenum. In such an embodiment air, and heat, is supplied via the upstream plenum 209, and the air is returned via the downstream plenum 210 for reheating. In one embodiment at least some air from the downstream plenum 210 is directed to the upstream plenum 209 rather than through an exhaust vent (not shown). Such an operation conserves energy as it allows for the re-use of air already at elevated temperatures.

In one embodiment there is an air treating device located between the downstream plenum 210 and the upstream plenum 209. The air treating device can comprise the same devices previously discussed including a heater, a cooler, a humidifier, and a dehumidifier. This air treating device allows the air conveyed between the upstream plenum 209 and downstream plenum 210 to be monitored, controlled, and adjusted. For example, in one embodiment the air treating device comprises a heater which re-heats air conveyed from the downstream plenum 210 to the upstream plenum 209.

The air supplied by the upstream plenum 209 can be heated via any method known in the art, including but not limited to, gas heating, electric heating, steam heating, etc. The heating can take place within the upstream plenum 209 or can take place remotely. In such embodiments, the upstream plenum 209 is in communication with an external air supply. In one embodiment the upstream plenum 209 receives air from the air supply (not shown) as well as the downstream plenum 210.

In one embodiment, each plenum is in fluid communication with a conduit 214, 215. The conduit 214, 215 is in communication to the oven cavity 218 through the oven ceiling 217. In one embodiment, the conduit 214, 215 extends for the length of its associated zone. As an example, in one embodiment, the upstream conduit 214 supplies air to the upstream end 201a. Air is supplied via the upstream plenum 209 to the upstream conduit 214 which distributes the air along the length of the upstream end 201a. Likewise, air is collected from the downstream end 201b by the downstream conduit 215 which subsequently directs the air into the downstream plenum 210. As previously mentioned, while the upstream end 201a is discussed as being the end in which air is supplied, this is for illustrative purposes only, and the invention is not so limited. In other embodiments, air is supplied via the downstream end 201b and is returned in the upstream end 201a.

In one embodiment, as depicted, the upstream end 201a comprises nozzles 204 whereas the downstream end 201b does not. In operation, for one embodiment, air is supplied via the upstream plenum 209. Air is directed into the oven cavity 218 via nozzles 204. Thus, the air is directed down in the upstream end 201a. Accordingly, air is forced to go downward through the bed of product. Thereafter, air is then directed to the pass-through 211. From here, the only exit for the air is through the downstream plenum 210. Therefore, the air is forced to move upward through the bed of product. Forcing the air to go through the bed of product ensures the product bed is uniformly heated. Further, because the air is forced to go through the bed of product as opposed to around, the air to product contact is increased which increases the heat transfer.

One embodiment has been discussed whereby the oven ceiling 217 comprises nozzles. In other embodiments, however, other devices are used to distribute the air. For example, in one embodiment the oven ceiling 217 comprises slots through which air is directed.

As discussed, in one embodiment the oven 201 is separated into separate zones: an upstream end 201a and a downstream end 201b. By separating the oven into separate zones, the temperature, humidity, etc. of each zone can be independently controlled. As discussed, if it is desirable that the product be heated or dehydrated at a specified rate, having two independent zones allows for increased control. As an example, the upstream end 201a may have an increased temperature compared to the downstream end 201b. Contrariwise, the downstream end 201b may have an increased temperature compared to the upstream end 201*a*. Thus, having two independent zones provides for increased control. Furthermore, the zones can be controlled by other data. For example, the humidity of the air in the downstream end 201*b* can be used as a set-point for the temperature in the upstream end 201*a*.

In one embodiment two or more ovens 201 are placed in series. In one such embodiment, downstream from a downstream end 201*b* will be an upstream end 201*a* of a downstream oven. In one embodiment of such an operation, air will flow in a downward direction in the first upstream end 201*a*, in an upward direction in the first downstream end 201*b*, and in the downward position in the second upstream end 201*a*. Having two or more ovens in series allows for increased control. For example, if there are two ovens in series then there are at least four zones which may be independently controlled and adjusted. As previously described, the temperature profile in each zone may be adjusted to mimic a desired heating profile. In one embodiment the second oven in series can be duplicated as a mirror image or duplicated in series with or without a gap between the two ovens.

Figure 3:
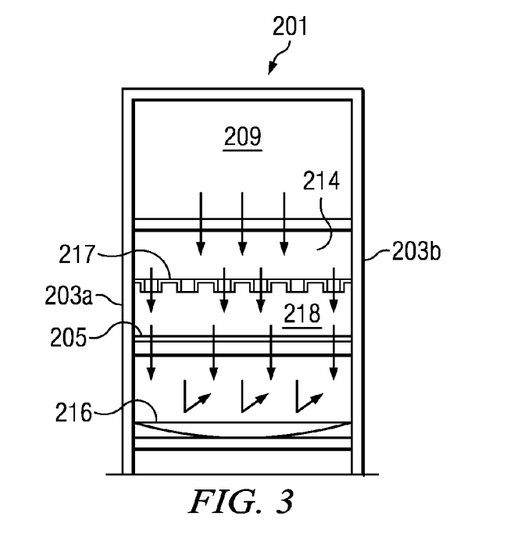
FIG. 3 is a rear profile view of the oven in one embodiment.

FIG. 3 is a rear profile view of the oven in one embodiment. As can be seen, the oven has a left side panel 203*a* and a right side panel 203*b*. The oven also has an oven floor 216 and an oven ceiling 217. The left and right side panels 203*a, b* attach the oven floor 216 to the oven ceiling 217. The oven cavity 218 is the void space within the oven into which product is introduced and heated. Thus, as depicted, the oven cavity 218 is the space defined between the oven ceiling 217 and the oven floor 216, and between the left 203*a* and right 203*b* side panels.

In one embodiment at least a portion of these side panels 203*a, b* are removable. In one embodiment at least a portion of these side panels 203*a, b* are removable in the form of doors. In one embodiment both the left 203*a* and right 203*b* side panels are removable. This makes entry into the oven 201 for inspection and cleaning much easier compared to the prior art ovens which offered only limited access or entry due to obstructive ducts from the sides of the oven as illustrated in FIG. 1. Accordingly, in one embodiment the oven 201 has ducts on the top of the oven. In one embodiment the oven does not comprise ducts on the side of the oven. In one embodiment the oven does not comprise ducts on either side of the oven.

In one embodiment, and as depicted, the conveyor 205 extends for the entire width of the oven cavity 213. Because the conveyor 205 extends for the width of the oven cavity 213, air is forced to flow through the product. If the conveyor 205 did not extend for the width of the oven cavity 213, then air would flow through the path of least resistance and flow through the unobstructed gap between the conveyor 205 and the side panel 203 rather than through the bed. In one embodiment the conveyor 205 does not physically extend for the width of the oven cavity 213, but a sealing device seals the gap or gaps between the conveyor 205 and the side panel 203.

The oven floor 216 may be a flat surface or it may comprise a modified shape to help reflect heat and or air and or cleaning water or other cleaning solutions in a desired direction. For example, referring back to FIG. 2, if the upstream end 201*a* has air directed downward, the oven floor 216 of the upstream end 201*a* may direct the air downstream whereas the oven floor 216 of the downstream end 201*b* may direct the flow of air upward. Those skilled in the art will understand that the shape and material type may be adjusted to direct the air as desired.

Now that the oven has been described, a method of utilizing the method will be described. In one embodiment the method comprises conveying product to an oven, wherein the oven comprises a cavity and a partition within said cavity, and wherein the partition separates said oven into an upstream end and a downstream end. Air is directed in said upstream end in a first direction and is directed in said downstream end in a second direction. The product is cooked in the oven to form a product which is subsequently removed from the oven. As stated above, in one embodiment the first direction of air and second directions are dissimilar. As an example, the first direction can be upward while the second direction is downward. The product cooked in the oven can comprise virtually any product. In one embodiment the product comprises dough. In one embodiment the product comprises pita bread dough. In another embodiment the product comprises pita bread cut into pieces.

As noted the method can further comprise monitoring and adjusting the upstream and downstream end independently. In another embodiment temperature sensors are strategically located at the entrance and exit of the oven. These sensors can be monitored to adjust makeup air inlet ports to the oven segments to ensure makeup air is drawn and heated prior to sending it into the oven chamber. This further prevents cold room air from being drawn into the oven through the oven openings such as the entrance and the exit. In one embodiment the makeup air is adjusted along with the exhaust to maintain a slight positive pressure in the oven cavity as well as controlling operating humidity. There are several benefits for operating at a slight positive pressure. As noted, a slight positive pressure will prevent cold air from seeping into the oven. If cold air is slowly seeping into the oven then that cold air requires heating. Thus, the oven becomes less efficient. If, however, the oven operates at a slight pressure relative to the pressure outside of the oven then cold air does not seep into the oven.

As noted, in one embodiment the temperature at the entrance and exit of the oven are monitored to adjust both the makeup air inlets and the exhaust vents to control, among other factors, pressure indirectly. In one embodiment a very slight positive pressure in maintained. In one embodiment the slight pressure ranges from about 0.0001 inches of water to about 0.0005 inches of water.

In one embodiment there is at least one temperature sensor inside the oven and at least one temperature sensor outside of the oven. If the outside temperature is room temperature, then this means the oven is operating at a slight vacuum. If the outside temperature is above room temperature or is increasing, then this means that the oven is operating at a slight pressure, depending on the temperature difference. This is because the oven is operating at increased temperature and if air is seeping out of the oven then the temperature of the air surrounding the oven should be increasing. Thus, with the minimal cost of at two temperature sensors, it can be assured that the oven is operating at a slight pressure. Because, in one embodiment, the pressures are so minimal, maintaining these minimal pressures with pressure switches becomes prohibitively expensive. However, using at least two temperature sensors provides an affordable method of ensuring the oven is operating at pressure. If the temperature sensors indicate that the oven is operating at a vacuum then the ratio of make-up air to exhaust can be slightly adjusted. For example, the amount of exhaust can be decreased slightly. This should increase the pressure within the oven. Thereafter, the temperature outside of the oven should rise slightly. In another embodiment, the makeup air can be increased passing through the heater.

While the invention has been particularly shown and described with reference to a preferred embodiment, it will be understood by those skilled in the art that various changes in form and detail may be made therein without departing from the spirit and scope of the invention.

ADDITIONAL DESCRIPTION

The following clauses are offered as further description of the disclosed invention.
1. A continuous oven comprising:
   an oven floor;
   an oven ceiling;
   a left side panel;
   a right side panel;
   wherein said oven floor and said oven ceiling are attached by said left and right side panels, thereby defining an oven cavity;
   at least one cascading conveyor located in said oven cavity, wherein said at least one cascading conveyor comprises a start end and a finish end, wherein said finish end is elevated compared to said start end; and
   a partition located in said oven cavity, thereby separating said oven into an upstream end and a downstream end.
2. The oven according to any preceding clause, comprising at least two cascading conveyors, wherein said at least two cascading conveyors comprise an upstream conveyor and a downstream conveyor, wherein each conveyor comprises a start end and a finish end, wherein said finish end is elevated compared to said start end.
3. The oven according to clause 2 wherein the start ends of said upstream conveyor and said downstream conveyor comprise substantially the same elevation.
4. The oven according to any preceding clause, wherein said oven cavity comprises a width defined by the distance between said left and right panels, and wherein said at least one cascading conveyor extends for the width of said oven cavity.
5. The oven according to any preceding clause, wherein said partition comprises a sealing device.
6. The oven according to clause 5 wherein said sealing device is located at the intersection between said partition and said at least one conveyor.
7. The oven according to any preceding clause, wherein said upstream end further comprises an upstream plenum, and wherein said downstream end further comprises a downstream plenum.
8. The oven according to clause 7 wherein said upstream end further comprises an upstream conduit which is in fluid communication with said upstream plenum and said oven ceiling, further wherein said downstream end further comprises a downstream conduit which is in fluid communication with said downstream plenum and said oven ceiling.
9. The oven according to clause 8 wherein said oven ceiling of said upstream end comprises nozzles.
10. The oven according to clause 7 wherein said upstream plenum is a supply plenum and wherein said downstream plenum is a return plenum.
11. The oven according to clause 8 wherein said upstream conduit extends for the length of said upstream end.
12. The oven according to any preceding clause, wherein said partition further comprises a pass-through device.
13. The oven according to clause 7 wherein at least one of said plenums is in fluid communication with an air treating device.
14. The oven according to any preceding clause, wherein said oven is a thru-flow oven.
15. The oven according to any preceding clause, wherein said oven is a convection oven.
16. The oven according to any preceding clause, wherein said oven is an impingement oven.
17. The oven according to any preceding clause, wherein air flows in a first direction in said upstream end, and wherein air flows in a second direction in said downstream end, wherein said first and second directions are different.
18. The oven according to clause 17 wherein said first direction is downward and wherein said second direction is upward.
19. The oven according to any preceding clause, wherein said oven is coupled in series to a downstream oven.
20. The oven according to any preceding clause, comprising at least eight cascading conveyors.
21. The oven according to any preceding clause, wherein said left and right side panels are removable.
22. The oven according to any preceding clause, comprising at least 16 cascading conveyors.
23. The oven according to any preceding clause, wherein said oven does not comprise ducts on either side of said oven.
24. A method of cooking comprising:
   a. conveying a product to an oven, wherein said oven comprises a cavity and a partition within said cavity, wherein said partition separates said oven into an upstream end and a downstream end;
   b. directing air in said upstream end in a first direction;
   c. directing air in said downstream end in a second direction, wherein said second direction is dissimilar from said first direction;
   d. cooking said product;
   e removing said product from said oven.
25. The method according to clause 24 wherein said first direction of step b) comprises a downward direction.
26. The method according to clauses 24-25 wherein said second direction of step c) comprises an upward direction.
27. The method according to clause 24 wherein said conveying of step a) comprises conveying with at least one cascading conveyor.
28. The method according to clause 24-27 wherein said directing of step b) comprises supplying air from a plenum supply.
29. The method according to clause 24-28 wherein said directing of step c) comprises providing a pass-though device located at said partition.
30. The method according to clause 24-29 wherein said step a) comprises conveying a dough to an oven.
31. The method according to clause 24-30 further comprising the step of maintaining said oven at a positive pressure.
32. The method according to clause 31 wherein said maintaining said oven at a positive pressure comprises monitoring at least one temperature sensor inside said oven and at least one temperature sensor outside of said oven.
33. The method according to clause 32 wherein said maintaining further comprises the step of adjusting the ratio of make-up air to exhaust based on said at least one temperature sensor inside said oven and said temperature sensor outside of said oven.

What is claimed is:
1. A continuous oven comprising:
   an oven floor;
   an oven ceiling;
   a left side panel;
   a right side panel;
   wherein said oven floor and said oven ceiling are attached by said left and right side panels, thereby defining an oven cavity;
   at least two cascading conveyors located in said oven cavity, wherein said at least two cascading conveyors com- prise a first upstream conveyor and an adjacent second downstream conveyor, wherein each of said at least two cascading conveyors comprise a start end and a finish end, wherein each finish end is elevated compared to said start end, wherein the start end of said first upstream conveyor is at substantially the same height as the start end of said second downstream conveyor, wherein the finish end of the first upstream conveyor is at substantially the same height as the finish end of the second downstream conveyor, wherein product is dropped from a higher elevation at the finish end of said first upstream conveyor onto a lower elevation at the start end of said second downstream conveyor, wherein each of said at least two cascading conveyors comprise a length and a height, wherein said length is greater than said height;

a partition located in said oven cavity, thereby separating said oven into an upstream end and a downstream end, and wherein air flows solely downwardly in a first vertical direction in said upstream end, and wherein air flows solely upwardly in a second vertical direction in said downstream end, wherein said first and second vertical directions are opposite to one another, and wherein said partition comprises a pass-through device positioned proximate the oven floor and below the at least two cascading conveyors;

an upstream conduit positioned above the upstream end and having a width at least as wide as a width of the upstream cascading conveyor, the upstream conduit connected to the upstream end via a first plurality of substantially uniformly spaced openings to provide the air flow downwardly in the first vertical direction substantially uniformly across the width of the upstream cascading conveyor; and a downstream conduit positioned above the downstream end and having a width at least as wide as a width of the downstream cascading conveyor, the downstream conduit connected to the downstream end via at least one opening to receive the air flow moving upwardly in the second vertical direction.

2. The oven of claim 1 wherein said oven cavity comprises a width defined by the distance between said left and right panels, and wherein said at least two cascading conveyors extend for the width of said oven cavity.

3. The oven of claim 1 wherein said partition comprises a sealing device.

4. The oven of claim 3 wherein said sealing device is located at the intersection between said partition and said at least two conveyors.

5. The oven of claim 1 wherein said upstream end further comprises an upstream plenum, and wherein said downstream end further comprises a downstream plenum.

6. The oven of claim 5 wherein said upstream conduit is in fluid communication with said upstream plenum and wherein said downstream conduit is in fluid communication with said downstream plenum.

7. The oven of claim 6 wherein said substantially uniformly spaced openings of said upstream end comprise nozzles.

8. The oven of claim 5 wherein said upstream plenum is a supply plenum and wherein said downstream plenum is a return plenum.

9. The oven of claim 6 wherein said upstream conduit extends for the length of said upstream end.

10. The oven of claim 5 wherein at least one of said plenums is in fluid communication with an air treating device.

11. The oven of claim 1 wherein said pass-through device is located below said cascading conveyors.

12. The oven of claim 1 wherein said oven is a thru-flow oven.

13. The oven of claim 1 wherein said oven is a convection oven.

14. The oven of claim 1 wherein said oven is an impingement oven.

15. The oven of claim 1 wherein the upstream conduit comprises a substantially uniform thickness across its width.

16. The oven of claim 15 wherein the upstream conduit has a length at least as long as a length of the upstream end.

17. The oven of claim 1 wherein said oven is coupled in series to a downstream oven.

18. The oven of claim 1 comprising at least eight cascading conveyors.

19. The oven of claim 1 wherein said left and right side panels are removable.

20. The oven of claim 1 comprising at least 16 cascading conveyors.

21. The oven of claim 1 wherein said oven does not comprise ducts on either side of said oven.

22. The oven of claim 1 wherein said at least one cascading conveyor comprises an angle of inclination between about 5 to about 20 degrees.

23. The oven of claim 1 wherein said cascading conveyors have a constant total conveyor height throughout said oven.

24. A method of cooking comprising:

a. conveying a product to an oven with at least two cascading conveyors, wherein said at least two conveyors comprise a first upstream conveyor and an adjacent second downstream conveyor, wherein each conveyor comprises a start end and a finish end, wherein each finish end is elevated compared to said start end, wherein the start end of the first upstream conveyor is at substantially the same height as the start end of the second downstream conveyor, wherein the finish end of the first upstream conveyor is at substantially the same height as the finish end of the second downstream conveyor, wherein said conveying comprises dropping product from a higher elevation at the finish end of the first upstream conveyor onto a lower elevation of the start end of the second downstream conveyor, wherein each of said cascading conveyors comprises a length and a height, wherein said length is greater than said height, wherein said oven comprises a cavity and a partition within said cavity, wherein said partition separates said oven into an upstream end and a downstream end;

b. directing air in said upstream end solely downwardly in a first vertical direction using an upstream conduit positioned above the upstream end and having a width at least as wide as a width of the upstream cascading conveyor, the upstream conduit connected to the upstream end via a first plurality of substantially uniformly spaced openings to provide the downwardly directed air in the first vertical direction substantially uniformly across the width of the upstream cascading conveyor;

c. directing air in said downstream end solely upwardly in a second vertical direction and into a downstream conduit positioned above the downstream end and having a width at least as wide as a width of the downstream cascading conveyor, the downstream conduit connected to the downstream end via at least one opening to receive the air flow moving upwardly in the second vertical direction, wherein said second vertical direction is opposite to said first vertical direction, and wherein said partition comprises a pass-through device positioned proximate the oven floor and below the at least two cascading conveyors;

d. cooking said product using air directed in both the downward and upward directions; and e. removing said cooked product from said oven.

25. The method of claim 24 wherein said directing of step b) comprises supplying air from a plenum supply to said upstream conduit in fluid communication with said plenum, wherein said substantially uniformly spaced openings comprise nozzles.

26. The method of claim 24 wherein said pass-through device is located below said cascading conveyors.

27. The method of claim 24 wherein said step a) comprises conveying a dough to an oven.

28. The method of claim 24 further comprising the step of maintaining said oven at a positive pressure.

29. The method of claim 28 wherein said maintaining said oven at a positive pressure comprises monitoring at least one temperature sensor inside said oven and at least one temperature sensor outside of said oven.

30. The method of claim 29 wherein said maintaining further comprises the step of adjusting the ratio of make-up air to exhaust based on said at least one temperature sensor inside said oven and said temperature sensor outside of said oven.

\* \* \* \* \*